Aug. 12, 1969   W. NESTLER ET AL   3,461,375
CIRCUIT ARRANGEMENT FOR TWO-STAGE ENERGIZATION OF LOAD
Filed Feb. 20, 1968

Wolfgang Nestler
Eberhard Kallenbach
INVENTORS.

BY

Karl G. Ross
Attorney

United States Patent Office 3,461,375
Patented Aug. 12, 1969

3,461,375
CIRCUIT ARRANGEMENT FOR TWO-STAGE ENERGIZATION OF LOAD
Wolfgang Nestler, Magdeburg, and Eberhard Kallenbach, Stutzerbach, Thurengia, Germany, assignors to VEB Magdeburger Armaturenwerke "Karl Marx" Karl-Liebknecht, Gemany, a corporation of Germany
Filed Feb. 20, 1968, Ser. No. 706,875
Int. Cl. H02m 7/44, 7/68
U.S. Cl. 321—43                                   8 Claims

ABSTRACT OF THE DISCLOSURE

A full-wave rectifier bridge for the energization of an inductive load from an alternating-current source includes, in one of its arms, a controlled rectifier whose gate electrode is biased by an RC-network having the cathode-gate impedance of the controlled rectifier as part of its charging resistance. The capacitance of this network is progressively charged during the first few operating cycles until the bias is so high that the controlled rectifier fails to fire and conduction takes place only through one branch of the bridge, thereby reducing the load current supplied.

---

Our present invention relates to a circuit arrangement for energizing a load in two stages, more specifically with a relatively high starting current and a relatively low steady-state current. This type of energization is particularly useful in conjunction with predominantly inductive loads, such as solenoids, which serve for the physical displacement of some structural member and for the retention of that member in its new position.

The general object of our invention is to provide means for automatically producing a stepped current, decaying within a predetermined period from its initial magnitude to its steady-state value, without the need for any mechanical contacts which are subject to wear upon repeated actuation.

A more particular object of this invention is to provide a circuit arrangement of the character described which can be readily used in association with an A-C/D-C converter and which can be installed or removed, advantageously as a separate module, without requiring any modification of the load itself or of its steady-state circuitry.

These objects are realized, pursuant to our present invention, by the provision of a coupling network with two branches, one of these branches including an electronic valve provided with a biasing circuit in the form of an RC-network whose capacitance is progressively charged, upon closure of a circuit connection between the load and its power supply, so as to eventually cut off the current flow through the initially unblocked valve. Thus, the load is first energized by way of both branches and is thereafter supplied with current over only one branch, i.e. the one which does not include the electronic valve. The latter advantageously is a thyratron-type element with two main electrodes and a control electrode, preferably of the semi-conductive variety; in the latter case the charging resistance for the biasing capacitance may conveniently include the gate/cathode impedance of such an element which is known as a solid-state controlled rectifier (SCR) or thyristor.

In accordance with a more particular feature of our invention, the coupling network between the load and its alternating-current source is a rectifier bridge with three arms essentially consisting of diodes and a fourth arm containing the aforedescribed controlled rectifier. In this case, full-wave rectification takes place as long as the thyristor is biased into conductivity during alternate half-cycles. When the biasing potential reaches the point where the thyristor ceases to fire, only one half of the bridge remains operative so that the load thereafter is energized solely during every other half-cycle. A predominantly inductive load connected in a closed loop, which includes two of the diodes of the bridge, will tend to maintain its state of energization during intervening half-cycles; if necessary, of course, a shunting condenser or a series inductance may be used to prevent intermittent deactivation.

The invention will be described in greater detail with reference to the accompanying drawing in which.

Figure 1:
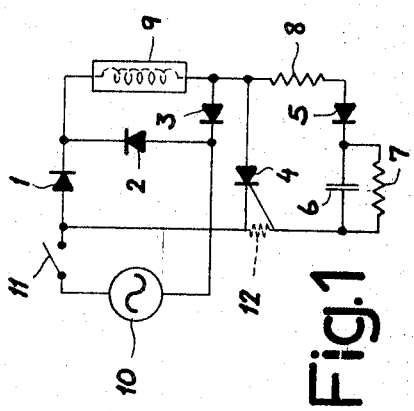
FIG. 1 is a circuit diagram illustrating a represenative embodiment.

In FIG. 1 we have shown a source 10 of single-phase alternating current for the energization of a load 9 which may be a solenoid, a relay winding or the like and which has been diagrammatically indicated as being predominantly inductive. A full-wave rectifier bridge inserted between the source 10 and the load 9 consists of four arms, i.e. three diodes 1, 2, 3 and a thyristor 4; a starting switch 11 is shown connected in series with the power supply 10. The thyristor 4, whose anode and cathode define a current path through the load in series with diode 2, has its gate biased by a time-constant network which includes a condenser 6 bridged by a resistor 7, the combination of elements 6, 7 being in series with a diode 5 and a further resistor 8. At 12 we have diagrammatically indicated another resistor which, together with element 8, represents the charging resistance of condenser 6 and which is constituted by the gate/cathode impedance of thyristor 4. It is to be noted that the polarity of diode 5 is so chosen as to pass current through network 6, 7 in the forward direction of the gate/cathode path.

Upon closure of starting switch 11, with condenser 6 fully discharged through resistor 7, thyristor 4 acts substantially like a diode since its gate is driven positive, concurrently with its anode, through a voltage divider which comprises resistor 8, diode 5, resistor 7 and impedance 12. At this stage, therefore, the bridge 1–4 acts as a full-wave rectifier to energize the load 9 at every half-cycle of source 11 whose output voltage has been indicated at $V_s$ in graph (a) of FIG. 2. In those half-cycles in which the polarity of the cathode of thyristor 4 is negative with reference to its anode, i.e. when diode 1 is blocked, gate current $I_g$ flows through the virtual resistance 12 to charge the condenser 6 and bias the thyristor gate more negatively. This has been illustrated in graph (b) of FIG. 2 where the first gate-current pulse is shown at $I_1$, this pulse terminating as soon as the gate current reaches the firing level $I_f$. Current $I_g$ is substantially proportional to the voltage differential $\Delta V$ existing between the source voltage $V_s$, impressed upon the cathode of the thyristor 4, and the gate voltage $V_g$, determined by the charge of condenser 6, as represented by the shaded area in graph (a). At the instant of firing, thyristor 4 breaks down to give rise to a voltage pulse $P_1$, graph (c), which energizes the load during the major part of the first "negative" half-cycle.

The time constant of the discharge path of capacitance 6 through resistor 7 is large, compared with the duration of a half-cycle of source 10 and also with the time constant of the charging circuit which includes the virtual resistance 12, the resistor 8, the forward resistances of diodes 2, 5 and the ohmic component of load 9. Thus, condenser 6 discharges at a slow rate so that its gate voltage $V_g$ still has an appreciable negative value at the beginning of the next "negative" half cycle. The next gate-current pulse $I_2$ is therefore delayed and reaches the firing level $I_f$ at a later point in the cycle, generating a somewhat shorter voltage pulse $P_2$ across the load 9.

Figure 2:
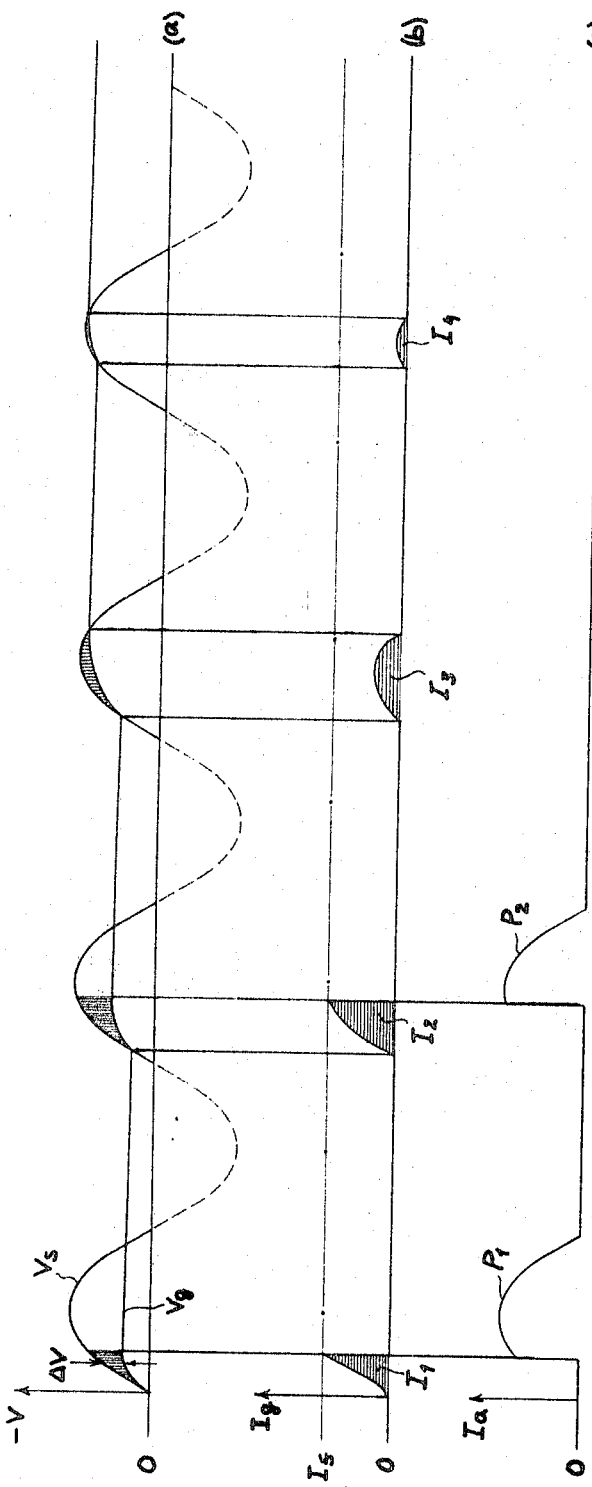
FIG. 2 is a set of graphs used for explaining the operation of the system of FIG. 1.

In the third cycle illustrated in FIG. 2, the gate voltage $V_g$ has risen to such a magnitude that the voltage difference $\Delta V$ no longer suffices to produce the firing current $I_f$ at any point of that cycle. Thus, current pulse $I_3$ decays without having generated a voltage pulse across the load, the same being true of the following current pulse $I_4$ and similar pulses during subsequent cycles. Naturally, depending upon the time constants selected, the actual number of energizing pulses $P_1$ etc. may be considerably greater than two.

During steady-state operation, with thyristor 4 permanently blocked by the charge of condenser 6, the inductivity of load 9 causes the circulation of residual currents through the loop formed by this load with diodes 2 and 3 during "negative" half-cycles; the average load current at that time is only about half the current available in the initial phase of operation.

Upon the opening of switch 11, condenser 6 discharges through resistor 7 to restore the original starting condition.

Elements 4–8 may be incorporated in a separate module, using integrated-circuit technique, which can be disconnected from the load and its associated circuitry 1–3, 10, 11 during steady-state operation or whenever its current-modifying characteristics are not needed.

We claim:

1. A circuit arrangement for producing a stepped load current, comprising:
    an alternating-current source;
    a load to be energized from said source;
    a coupling network inserted between said source and said load, said network including a first branch and a second branch;
    electronic valve means in said second branch provided with a control electrode for selectively blocking and unblocking the flow of current therethrough;
    and biasing means for said control electrode connected, upon closure of a circuit from said source via said network to said load, to be progressively charged until said valve means is switched from an unblocked condition to a blocked condition in which load current passes only through said first branch, thereby varying the magnitude of said load current from a relatively high starting value to a relatively low steady-rate value.

2. A circuit arrangement as defined in claim 1 wherein said coupling network is a full-wave rectifier bridge with a first pair of arms constituting said first branch and a second pair of arms constituting said second branch.

3. A circuit arrangement as defined in claim 2 wherein said electronic valve means comprises a semiconductor element provided with two main electrodes in one of the arms of said second branch and with a control electrode, said biasing means including a capacitance and a charging resistance therefor serially connected across said main electrode and forming a juntion connected to said control electrode.

4. A circuit arrangement as defined in claim 3 wherein said semiconductor element is a controlled rectifier with a cathode and an anode representing said main electrodes and with a gate representing said control electrode.

5. A circuit arrangement as defined in claim 4 wherein said charging resistance includes the cathode/gate resistance of said controlled rectifier.

6. A circuit arrangement as defined in claim 5 wherein said biasing means further includes a diode in series with said capacitance and poled in the forward direction of gate-current flow.

7. A circuit arrangement as defined in claim 6 wherein said biasing means further includes a resistive discharge path connected across said capacitance with a time constant substantially greater than an operating half-cycle of said source and exceeding the time constant of said capacitance and charging resistance.

8. A circuit arrangement as defined in claim 2 wherein said load is predominantly inductive, said bridge including a pair of diodes forming a closed loop with said load.

References Cited
UNITED STATES PATENTS

| | | | |
|---|---|---|---|
| 3,140,429 | 7/1964 | Mais | 317—154 |
| 3,391,332 | 7/1968 | Funfstuck | 323—22 |

JOHN F. COUCH, Primary Examiner

W. M. SHOOP, Jr., Assistant Examiner

U.S. Cl. X.R.

317—123, 154; 321—47.

Notice of Adverse Decisions in Interferences

In Interference No. 97,420 involving Patent No. 3,461,375, W. Nestler and E. Kallenbach, CIRCUIT ARRANGEMENT FOR TWO-STAGE ENERGIZATION OF LOAD, final judgment adverse to the patentees was rendered Feb. 29, 1972, as to claims 1, 2, 3, 4, 5, 6 and 8.

[*Official Gazette March 6, 1973.*]